(12) United States Patent
Sim

(10) Patent No.: US 10,128,068 B2
(45) Date of Patent: Nov. 13, 2018

(54) TERMINAL ASSEMBLY FOR VACUUM CONTACTOR SWITCH

(71) Applicant: LSIS CO., LTD., Gyeonggi-do (KR)

(72) Inventor: Byeong-Sun Sim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/605,461

(22) Filed: May 25, 2017

(65) Prior Publication Data

US 2018/0158628 A1    Jun. 7, 2018

(30) Foreign Application Priority Data

Dec. 5, 2016    (KR) .......................... 10-2016-0164089

(51) Int. Cl.
*H01H 33/02* (2006.01)
*H01H 33/66* (2006.01)
(Continued)

(52) U.S. Cl.
CPC .......... *H01H 33/025* (2013.01); *H01H 33/53* (2013.01); *H01H 33/6606* (2013.01); *H02B 11/04* (2013.01); *H02B 3/00* (2013.01)

(58) Field of Classification Search
CPC ............. H01H 33/6606; H01H 33/025; H01H 33/6613; H01H 33/53; H01H 1/46; H01H 85/0241; H02B 11/04; H02B 3/00
(Continued)

(56) References Cited

U.S. PATENT DOCUMENTS 3,823,288 A * 7/1974 Wilson ................. H01H 33/666
                                                                200/50.23
4,005,297 A * 1/1977 Cleaveland ............. F28D 15/02
                                                                165/104.26
(Continued)

FOREIGN PATENT DOCUMENTS

EP    0820079 A2    1/1998
EP    2487700 A1    8/2012
(Continued)

OTHER PUBLICATIONS

Korean Office Action for related Korean Application No. 10-2016-0164089; action dated Jan. 19, 2018; (4 pages).
(Continued)

*Primary Examiner* — Edwin A. Leon
*Assistant Examiner* — William Bolton
(74) *Attorney, Agent, or Firm* — K&L Gates LLP

(57) ABSTRACT

The present disclosure relates a terminal assembly for a vacuum contactor switch which is connected to a terminal of a cradle with electricity applicability to protect a power system by breaking circuits in the event of a dangerous situation such as a short circuit or an overcurrent. The terminal assembly includes a body portion, a connecting member, a contactor and a bush. The body portion is inserted into a terminal hole formed in the terminal of the cradle and provided with first fastening holes formed in opposite side surface thereof. The contactor is connected to one end of the body portion through a connecting member. The bush has a pair of pieces disposed to surround a periphery of the body portion with both ends of one of the pieces facing both ends of the other piece.

5 Claims, 4 Drawing Sheets

(51) Int. Cl.
*H01H 33/53* (2006.01)
*H02B 11/04* (2006.01)
*H02B 3/00* (2006.01)

(58) Field of Classification Search
USPC .................. 218/118, 134, 139, 155, 121
See application file for complete search history.

(56) References Cited

U.S. PATENT DOCUMENTS

| | | | |
|---|---|---|---|
| 5,757,260 A | 5/1998 | Smith et al. | |
| 5,929,410 A * | 7/1999 | Mun | H01H 1/62 |
| | | | 218/121 |
| 7,852,617 B2 * | 12/2010 | Lee | H01H 33/6606 |
| | | | 361/676 |
| 8,178,801 B2 * | 5/2012 | Yanniello | H02B 11/12 |
| | | | 200/293 |
| 8,294,056 B2 * | 10/2012 | Seo | H01H 33/6606 |
| | | | 218/121 |
| 8,779,319 B2 * | 7/2014 | Yang | H02B 11/04 |
| | | | 218/154 |

FOREIGN PATENT DOCUMENTS

| | | |
|---|---|---|
| JP | 2521747 Y2 | 1/1997 |
| JP | 4744474 B2 | 8/2011 |
| KR | 20-0198010 Y1 | 10/2000 |
| KR | 20-0217128 Y1 | 3/2001 |
| KR | 20-0455482 Y1 | 9/2011 |
| KR | 10-1158652 B1 | 6/2012 |
| KR | 10-2013-0102284 A | 9/2013 |
| WO | WO2010098699 A1 * 9/2010 ........... H01H 33/664 |
| WO | 2011/061579 A1 | 5/2011 |

OTHER PUBLICATIONS

European Search Report for related European Application No. 17173185.4; report dated Jan. 31, 2018; (8 pages).

* cited by examiner

US 10,128,068 B2

TERMINAL ASSEMBLY FOR VACUUM CONTACTOR SWITCH

CROSS-REFERENCE TO RELATED APPLICATIONS

This application claims the priority of Korean Patent Application No. 10-2016-0164089 filed on Dec. 5, 2016, in the Korean Intellectual Property Office, the disclosure of which is hereby incorporated by reference in its entirety.

BACKGROUND

1. Technical Field

The present disclosure relates to a terminal assembly for a vacuum contactor switch which is connected to a terminal of a cradle with electricity applicability to protect a power system by breaking circuits in the event of a dangerous situation such as a short circuit or an overcurrent.

2. Description of the Related Art

Typically, the vacuum contactor switch (VCS), which is an industrial device for turning on/off high-voltage-related electric devices such as a high-voltage motor, a transformer and a condenser, is designed to withstand the frequent opening and closing operation with a capability of allowing application of a high-voltage rated current.

Specifically, the VCS mainly functions to control opening and closing of an electric circuit. The VCS is used to protect and control loads such as a motor by operating/stopping the loads. The operation of the VCS is selectively performed by operation of an electromagnet.

The VCSs may be divided into fixed VCSs configured with a breaker body alone and fixedly installed on a distribution board panel and withdrawable VCSs provided with a cabinet called a cradle for facilitating maintenance of the contactor switch and configured to allow the breaker body to be inserted into/withdrawn from the cradle.

FIG. 1 is a diagram illustrating a withdrawable VCS according to the prior art. Hereinafter, a description will be given of current flow formed with a breaker body 1 coupled to a cradle 2.

First, a current applied through an insertion bus bar 10 enters into a main circuit part 40 via a bushing terminal 20 and a contactor 31 and body portion 32 of an upper terminal assembly 30. The current having entered into the main circuit part 40 flows to a load-side withdrawal bus bar 70, passing through a body portion 52 and contactor 51 of a lower terminal assembly 50 and a bushing terminal 60 via a vacuum interrupter in the main circuit part 40.

That is, when the body portions 32 and 52 of the terminal assemblies 30 and 50 move back and forth while being inserted and fixed in terminal holes 80 of the cradle 2, the current is applied to the load side or interrupted according to connection/disconnection of the contactors 31 and 51 to/from the bushing terminals 20 and 60.

However, in the case of the conventional VCS, since the diameters of the terminal holes are divided into 29 mm and 35 mm according to the type of the cradle, it is required to use a terminal assembly having a different diameter according to the size of the terminal holes.

Therefore, change in the diameter of the terminal hole requires employment and installation of a corresponding terminal assembly, and accordingly it is difficult to manage the components. Further, terminal assemblies having a diameter of 29 mm and a diameter of 35 mm need be manufactured, respectively, which results in increase in the manufacturing cost.

SUMMARY

It is an object of the present disclosure to provide a terminal assembly for a vacuum contactor switch which is installable in all cradles having terminal holes of different sizes by detachably arranging a bush around a body portion.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a terminal assembly for a vacuum contactor switch, connected to a terminal of a cradle so as to allow an electric current to be applied, includes a body portion, a contactor and a bush. The body portion is inserted into a terminal hole formed in the terminal of the cradle and provided with first fastening holes formed in opposite side surface thereof. The contactor is connected to one end of the body portion through a connecting member. The bush is disposed between the terminal hole and the body portion to adjust a clearance between the terminal hole and the body portion, has a pair of pieces disposed to surround a periphery of the body portion with both ends of one of the pieces facing both ends of the other piece, and is detachably mounted on the body portion through a first fastening member.

According to the present disclosure, as a bush is detachably arranged around a body portion, the clearance between the body portion and the terminal hole may be adjusted. Accordingly, one terminal assembly can be installed in all cradles having terminal holes of different sizes. Therefore, the components may be easily managed and the working time may be shortened.

In addition, since the need for fabrication of terminal assemblies having different diameters is eliminated, the manufacturing cost is reduced.

DETAILED DESCRIPTION

Figure 1:
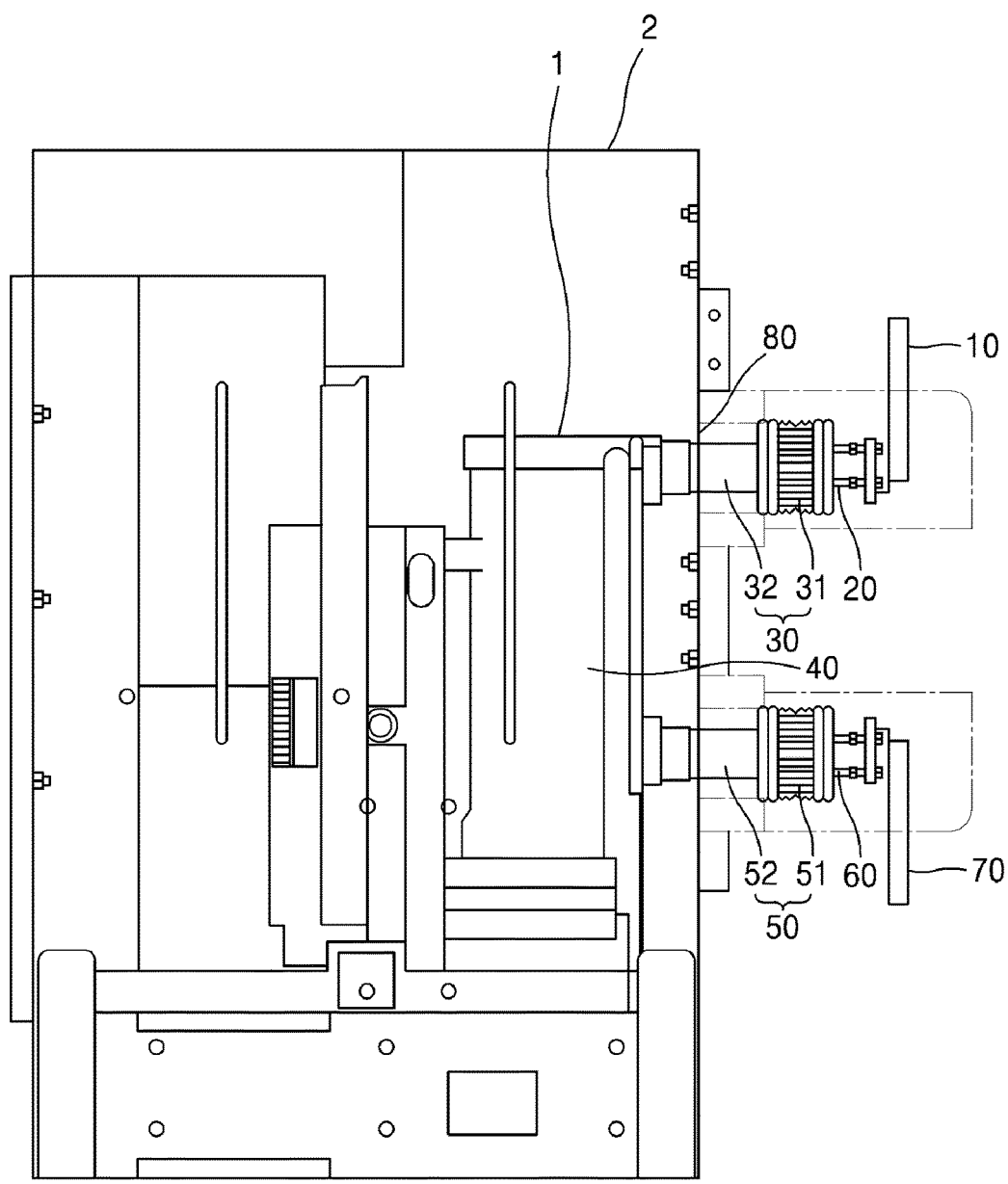
FIG. 1 is a configuration diagram schematically illustrating a withdrawable vacuum contactor switch (VCS) according to the prior art.

The above objects, features and advantages will become apparent from the detailed description with reference to the accompanying drawings. Embodiments are described in sufficient detail to enable those skilled in the art to easily practice the technical idea of the present disclosure. Redundant description and detailed descriptions of well-known functions or configurations may be omitted in order not to unnecessarily obscure the gist of the present disclosure. Hereinafter, a terminal assembly for a vacuum contactor switch according to preferred embodiments of the present disclosure will be described in detail with reference to the accompanying drawings. Throughout the drawings, like reference numerals refer to like elements. Embodiments of the disclosure are provided to more fully describe the present disclosure to those skilled in the art. It will be appreciated that for clarity of illustration, the shapes and dimensions of some of the elements can be exaggerated.

Figure 2:
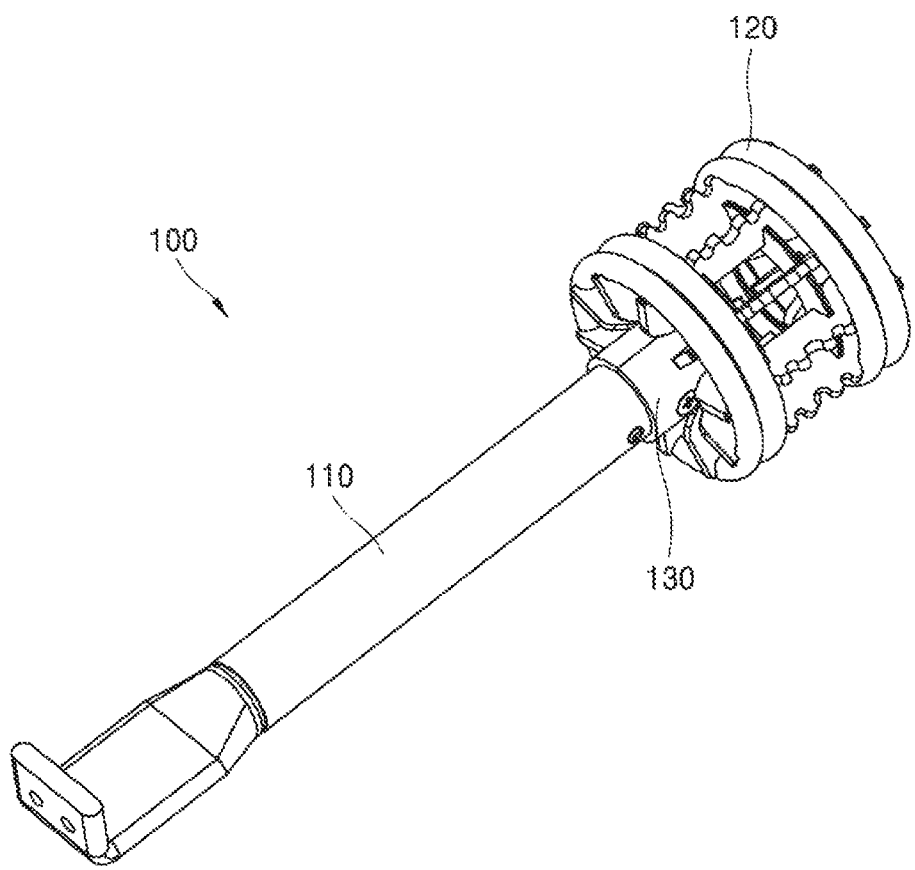
FIG. 2 is a perspective view of a terminal assembly for a VCS according to an embodiment of the present disclosure.
Figure 3:
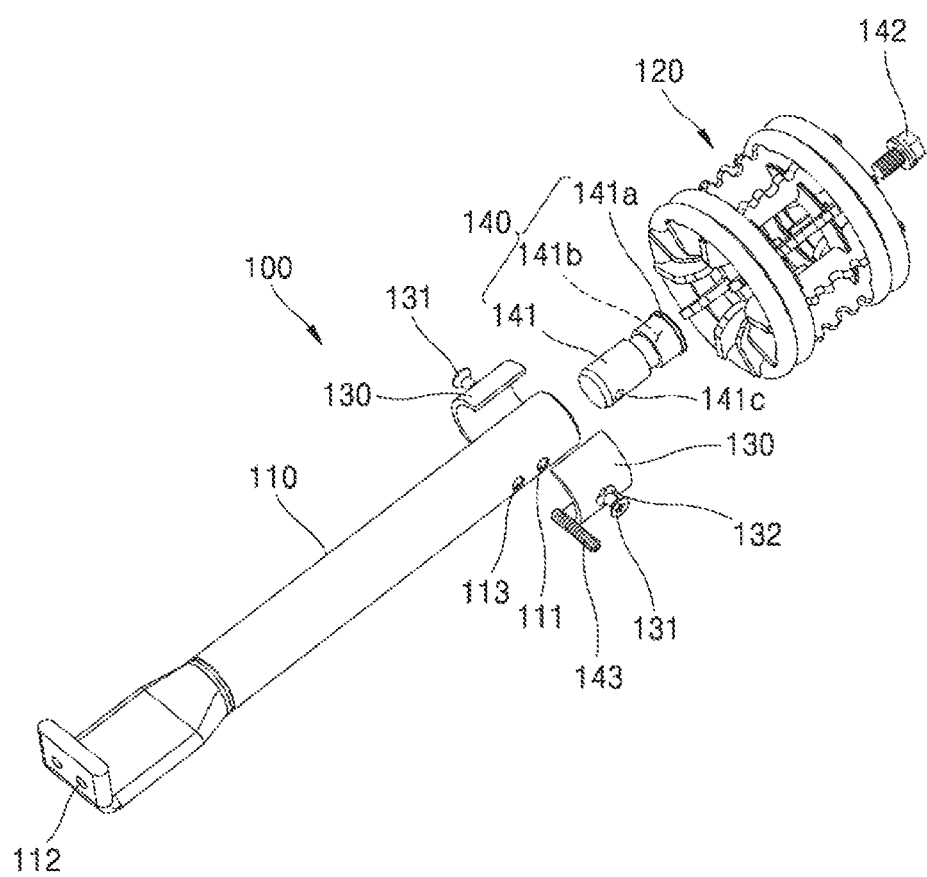
FIG. 3 is an exploded perspective view of the terminal assembly for a VCS shown in FIG. 2.
Figure 4:
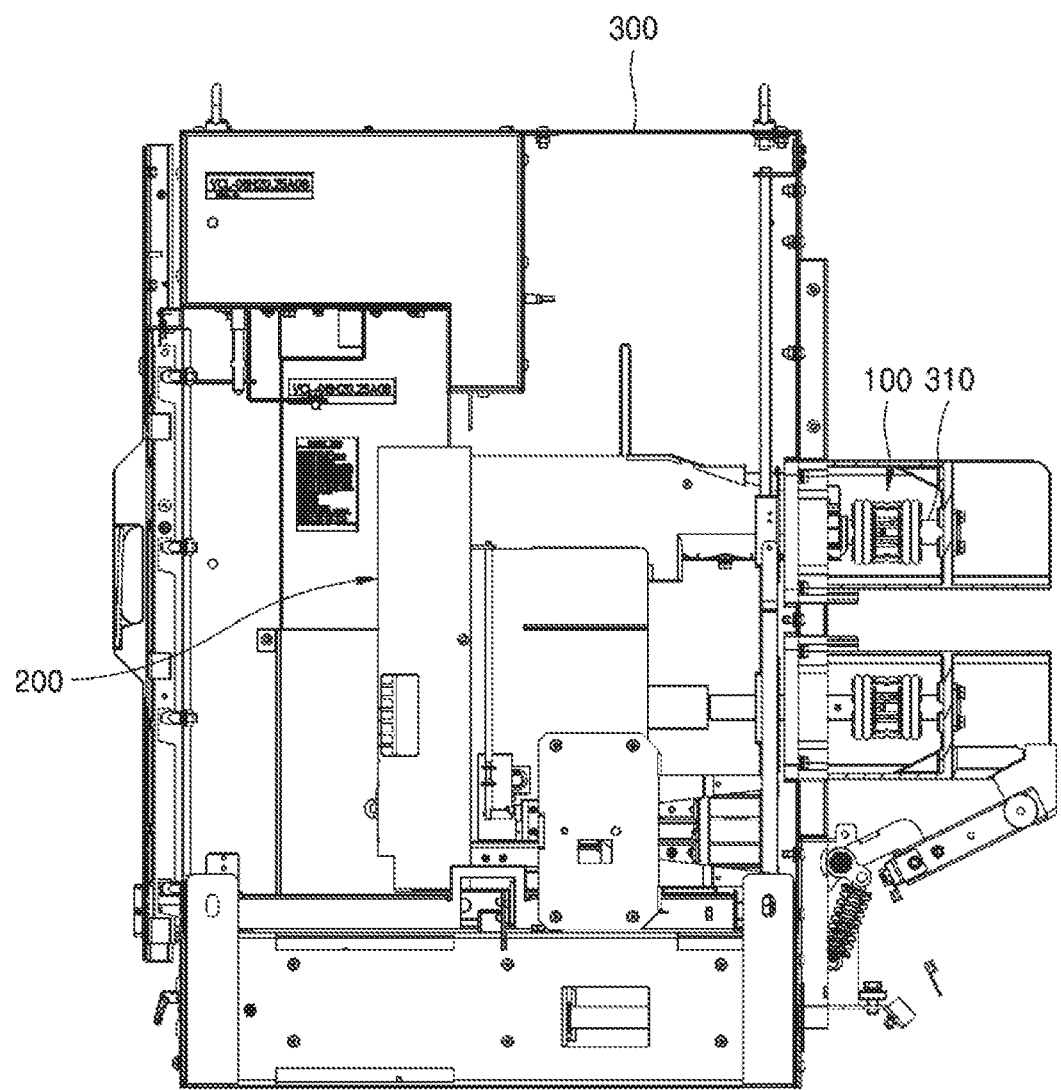
FIG. 4 is a diagram illustrating use of the terminal assembly for a VCS of FIG. 2 installed in a cradle.

FIG. 2 is a perspective view of a terminal assembly for a vacuum contactor switch (VCS) according to an embodiment of the present disclosure, and FIG. 3 is an exploded perspective view of the terminal assembly for a VCS shown in FIG. 2. FIG. 4 is a diagram illustrating use of the terminal assembly for a VCS of FIG. 2 installed in a cradle.

As shown in FIGS. 2 to 4, a terminal assembly 100 for a VCS includes a body portion 110, a contactor 120, and a bush 130. The terminal assembly 100 for a VCS is connected to the terminal of a cradle 300 so as to enable application of an electric current. The terminal assembly 100 is electrically connected to a breaker body 200 of the VCS in order to serve to protect the power system by breaking the circuits by separating the cradle 300 from the breaker body 200 in the event of a dangerous situation such as a short circuit or an overcurrent.

The body portion 110 is inserted into a terminal hole formed in the terminal 310 of the cradle 300, and is provided with first fastening holes 111 formed on opposite side surfaces thereof. Specifically, the body portion 110 may be formed in a cylindrical shape having a longitudinal hollow, and be provided with a coupling hole 112 at the leading end thereof so as to be connected to the circuit of the cradle 300 through a coupling member such as a bolt.

The body portion 110 may be formed of a copper material. This is because copper is relatively inexpensive, easy to process, and has good electrical conductivity.

The contactor 120 is connected to one end of the body portion 110 by a connecting member 140.

Specifically, one side of the connecting member 140 is coupled to the body portion 110, and the other side of the connecting member 140 is coupled to the contactor 120. The contactor 120 may have a longitudinal hollow therein and be formed of a copper material as in the case of the body portion 110. As the contactor 120 is formed of the same material as that of the body portion 110, there is no change in electric conductivity when the contactor 120 is connected to the body portion 110 by the connecting member 140. Therefore, very smooth flow of an electric current may be ensured.

The bush 130 is disposed between the terminal hole of the cradle 300 and the body portion 110 and used to adjust the clearance between the terminal hole and the body portion 110. The bush 130 comes in two pieces and is disposed to surround the periphery of the body portion 110 with both ends of one piece facing both ends of the other piece. To this end, the inner circumferential surface of the bush 130 may be formed to have a diameter equal to that of the body portion 110, and the outer circumferential surface of the bush 130 may be formed to have a diameter equal to that of the terminal hole of the cradle 300.

The bush 130 is detachably connected to the body portion 110 by first fastening members 131. Specifically, the bush 130 has second fastening holes 132 corresponding to the first fastening holes 111 of the body portion 110 on the opposite side surfaces thereof. The bush 130 may be fastened to the body portion 110 using the first fastening members 131 inserted into the first and second fastening holes 111 and 132.

As the bush 130 is mounted around the body portion 110 as described above, the terminal assembly 100 may be installed in all cradles with terminal holes of different sizes.

In conventional cases, since the diameters of the terminal holes are divided into 29 mm and 35 mm according to the types of the cradle terminal holes, changing one cradle to another requires change of the terminal assembly to another terminal assembly whose size fits the diameter of the terminal hole of the other cradle.

However, if the bush 130 is detachably mounted around the body portion 110 as described above, one terminal assembly 100 can be inserted into terminal holes of different sizes.

For example, when the size of the terminal hole of the cradle 300 is changed from 29 mm to 35 mm, the bush 130 is mounted around the body portion 110 and then inserted into the terminal hole to adjust the clearance between the terminal hole and the body portion 110. Here, the diameter of the inner circumferential surface of the bush 130 may be 29 mm, and the diameter of the outer circumferential surface of the bush 130 may be 35 mm.

When the size of the terminal hole of the cradle 300 is changed from 35 mm to 29 mm, only the body portion 110 can be inserted into the terminal hole after the bush 130 mounted on the body portion 110 is removed. At this time, the diameter of the body portion 110 may be 29 mm. That is, the diameter of the body portion 110 is formed based on the diameter of a terminal hole having the smallest size among the terminal holes formed in the cradle 300.

As the bush 130 is detachably mounted on the body portion 110 depending on the size of a terminal hole of the cradle 300, the terminal assembly 100 can be commonly used. Thereby, the components may be easily managed and the working time may be shortened.

The connecting member 140 for connecting the body portion 110 and the contactor 120 may include a holder 141, a second fastening member 142, and a third fastening member 143.

The holder 141 has a leading end disposed in the hollow of the body portion 110 and a trailing end disposed in the hollow of the contactor 120, and has a third fastening hole 141b formed therein. Here, the third fastening hole 141b may be formed in a spiral shape along the circumference of the hollow.

The holder 141 has a support member 141a protruding outward from the trailing end thereof, and the hollow of the contactor 120 is provided with a step (not shown), on which the support member 141a is seated when the holder 141 is inserted into the hollow of the contactor 120. Accordingly, when is inserted into the contactor 120, the holder 141 is caught by the step and is no longer moved.

With the holder 141 inserted into the hollows of the body portion 110 and the contactor 120, the second fastening member 142 is fastened in the third fastening hole 141b. Accordingly, when the second fastening member 142 is turned in a fastening direction, the support member 141a of the holder 141 as seated on the step of the contactor 120 is pressed such that the contactor 120 is not separated from the holder 141.

With the holder 141 inserted into the hollows of the body portion 110 and the contactor 120, the third fastening member 143 is inserted into fourth fastening holes 113, which are formed on opposite sides of the body portion 110, and fifth fastening holes 141c, which are formed on opposite sides of the holder 141. That is, the third fastening member 143 is arranged through the body portion 110 and the holder 141. Separation of the holder 141 from the body portion 110 is prevented by the third fastening member 143.

As the contactor 120 and the body portion 110 are fixed to both ends of the holder 141 by the second fastening member 142 and the third fastening member 143, the body portion 110 and the contactor 120 are connected with one surface of the body portion 110 facing one surface of the contactor 120.

The connecting member 140 does not include the third fastening member 143, but the holder 141 may be provided with a protrusion (not shown) that corresponds to the fourth fastening holes 113 and is elastically supported. In this case, when the connecting member 140 is inserted into the body portion 110, the connecting member 140 is fixed to the body portion 110 in a manner that the protrusion is coupled to the fourth fastening holes 113.

As described above, in the case of the terminal assembly 100 for a VCS, as the bush 130 is detachably mounted around the body portion 110, the clearance between the body portion 110 and the terminal hole can be adjusted. Accordingly, one terminal assembly 100 can be installed in all the cradles with terminal holes of different sizes. Therefore, the components may be easily managed and the working time may be shortened.

In addition, since the need for fabrication of terminal assemblies 100 having different diameters is eliminated, the manufacturing cost is reduced.

While the present disclosure has been particularly shown and described with reference to exemplary embodiments thereof in the accompanying drawings, it is clearly understood that the same is by way of illustration and example only and is not to be taken by way of limitation and that the present disclosure described above may be variously substituted, altered, and modified by those skilled in the art to which the present invention pertains without departing from the scope and sprit of the present disclosure. Therefore, the true scope of protection of the present disclosure should be determined only by the appended claims.

What is claimed is:

1. A terminal assembly for a vacuum contactor switch, connected to a terminal of a cradle so as to allow an electric current to be applied, the terminal assembly comprising:
    a body portion inserted into a terminal hole formed in the terminal of the cradle and provided with a first plurality of fastening holes formed in opposite side surface thereof;
    a connecting member having one side coupled to the body portion;
    a contactor coupled to the other side of the connecting member and connected to one end of the body portion through the connecting member;
    a bush disposed between the terminal hole and the body portion to adjust a clearance between the terminal hole and the body portion and having a pair of pieces disposed to surround a periphery of the body portion with both ends of one of the pieces facing both ends of the other piece, the bush being detachably mounted on the body portion through a first fastening member; and
    wherein the bush is provided with a second plurality of fastening holes corresponding to the first plurality of fastening holes of the body portion on opposite side surfaces thereof and fastened to the body portion through the first fastening member inserted into the first plurality of fastening holes and the second plurality of fastening holes.

2. The terminal assembly according to claim 1, wherein an inner circumferential surface of the bush is formed to have a diameter equal to a diameter of the body portion, and an outer circumferential surface of the bush is formed to have a diameter equal to a diameter of the terminal hole.

3. The terminal assembly according to claim 1, wherein a fourth plurality of fastening holes are formed on opposite sides of the body portion, and a fifth plurality of fastening holes are formed on opposite sides of a holder,
    wherein the connecting member comprises:
    a holder having a leading end disposed in a hollow of the body portion and a trailing end disposed in a hollow of the contactor and having a third fastening hole formed therein;
    a second fastening member fastened to the third fastening hole with the holder inserted into the hollow of the body portion and the hollow of the contactor; and
    a third fastening member inserted into the fourth plurality of fastening holes and the fifth plurality of fastening holes with the holder inserted into the hollow of the body portion and the hollow of the contactor.

4. The terminal assembly according to claim 3, wherein the holder is provided with a support member protruding outward from the trailing end,
    wherein the hollow of the contactor is provided with a step on which the support member is seated when the holder is inserted into the hollow of the contactor.

5. The terminal assembly according to claim 1, wherein the body portion and the contactor are formed of a copper material.

* * * * *